United States Patent
Mashimo et al.

(10) Patent No.: US 7,212,486 B2
(45) Date of Patent: May 1, 2007

(54) OPTICAL DISK DEVICE SETTING A GAIN OF AN AMPLIFIER SO THAT A PEAK VALUE AND A BOTTOM VALUE OF WOBBLE SIGNAL COMPONENTS COINCIDE

(75) Inventors: Akira Mashimo, Tokorozawa (JP); Keishi Ueno, Iruma (JP)

(73) Assignee: TEAC Corporation (JP)

( * ) Notice: Subject to any disclaimer, the term of this patent is extended or adjusted under 35 U.S.C. 154(b) by 634 days.

(21) Appl. No.: 10/283,802

(22) Filed: Oct. 29, 2002

(65) Prior Publication Data
US 2003/0081531 A1 May 1, 2003

(30) Foreign Application Priority Data
Oct. 29, 2001 (JP) .............................. 2001-331260

(51) Int. Cl.
*G11B 7/00* (2006.01)
(52) U.S. Cl. ..................... 369/124.12; 369/124.15; 369/59.17; 369/44.13
(58) Field of Classification Search ............ 369/124.12
See application file for complete search history.

(56) References Cited

U.S. PATENT DOCUMENTS

| | | | |
|---|---|---|---|
| 5,459,706 A * | 10/1995 | Ogawa et al. ............ 369/53.31 |
| 5,930,222 A | 7/1999 | Yoshida et al. |
| 6,339,581 B1 * | 1/2002 | Yoshida et al. ......... 369/124.14 |
| 6,487,149 B1 * | 11/2002 | Yokoi et al. ............. 369/47.25 |
| 6,526,007 B1 * | 2/2003 | Fujita ..................... 369/44.32 |
| 6,891,784 B2 * | 5/2005 | Yanagawa et al. ....... 369/47.22 |

FOREIGN PATENT DOCUMENTS

| | | |
|---|---|---|
| EP | 1 067 524 A2 | 1/2001 |
| JP | 10283638 A | 10/1998 |
| JP | 2001-23168 | 1/2001 |
| JP | 2002-117536 | 4/2002 |
| JP | 2001-331260 | 5/2003 |

* cited by examiner

*Primary Examiner*—Andrea Wellington
*Assistant Examiner*—Peter Vincent Agustin
(74) *Attorney, Agent, or Firm*—Anderson Kill & Olick, PC

(57) ABSTRACT

In this optical disk device, a reflected light of a light beam reflected from a pre-pit-formed side of a track wobbled on a disk is detected as a first detection signal. A reflected light of the light beam reflected from the other side of the track is detected as a second detection signal. The first detection signal and/or the second detection signal are/is amplified with a gain(s) so set that a peak value of a wobble signal component of the first detection signal coincides with a bottom value of a wobble signal component of the second detection signal.

7 Claims, 11 Drawing Sheets

US 7,212,486 B2

OPTICAL DISK DEVICE SETTING A GAIN OF AN AMPLIFIER SO THAT A PEAK VALUE AND A BOTTOM VALUE OF WOBBLE SIGNAL COMPONENTS COINCIDE

BACKGROUND OF THE INVENTION

1. Field of the Invention

The present invention generally relates to an optical disk device, and more particularly, to an optical disk device causing a light beam to be projected intermittently with different powers.

2. Description of the Related Art

FIG. 1 is a block diagram of an optical disk device. FIG. 2 is an illustration for explaining a structure of an optical disk.

An optical disk device 100 shown in FIG. 1 is a DVD-R drive, for example; a DVD-R disk 40 is mounted thereon so that the optical disk device 100 records/reproduces information to/from the DVD-R disk 40.

On the DVD-R disk 40, as shown in FIG. 2, a wobble 40b is formed along a track 40a to/from which information is recorded/reproduced. The wobble 40b is so formed as to undulate in radial directions of the disk at a predetermined cycle. By reproducing the wobble 40b, a disk revolution control signal, a pre-pit detection gate signal and so forth are obtained.

Additionally, on the DVD-R disk (or a DVD-RW disk), an address on the disk is recorded as LPPs (land pre-pits) pre-pitted on the land (the track) 40a.

The optical disk device 100 comprises an optical system 41, a spindle motor 42, a sled motor 43, a laser driver 44, a front monitor 45, an ALPC (Auto Laser Power Control) circuit 46, a recording compensation circuit 47, a wobble signal processing unit 48, an RF amplifier 49, a focus/tracking servo circuit 50, a feed servo circuit 51, a spindle servo circuit 52, a DVD encode/decode circuit 53, RAMs 56 and 58, an interface/buffer controller 59, and a CPU 60; the optical disk device 100 records/reproduces information according to a command from a host computer 61.

The spindle motor 42 is driven by the spindle servo circuit 52 so as to cause the disk 40 to revolve at a predetermined revolving speed. The optical system 41 is positioned opposite the disk 40. The optical system 41 includes a laser diode and a quadripartite photodetector. The optical system 41 projects a laser light on the disk 40 so as to record information on the disk 40, and also outputs a reproduction signal corresponding to recorded information according to a light reflected from the disk 40. The quadripartite photodetector is divided in four zones of A, B, C and D, for example. As shown in FIG. 2, the zone A detects a portion of the reflected light of a laser beam LB, the portion being located at an outer side, i.e., at an arrow-A1 side, and at a scanning-direction side of the laser beam LB, i.e., at an arrow-B1 side. As shown in FIG. 2, the zone B detects a portion of the reflected light of the laser beam LB, the portion being located at an inner side, i.e., at an arrow-A2 side, and at the scanning-direction side of the laser beam LB, i.e., at the arrow-B1 side.

As shown in FIG. 2, the zone C detects a portion of the reflected light of the laser beam LB, the portion being located at the inner side, i.e., at the arrow-A2 side, and at a non-scanning-direction side of the laser beam LB, i.e., at an arrow-B2 side. As shown in FIG. 2, the zone D detects a portion of the reflected light of the laser beam LB, the portion being located at the outer side, i.e., at the arrow-A1 side, and at the non-scanning-direction side of the laser beam LB, i.e., at the arrow-B2 side.

The optical system 41 is controlled by the sled motor 43 and the focus/tracking servo circuit 50 in positioning the light beam LB projected on the disk.

The above-mentioned sled motor 43 is driven and controlled by the feed servo circuit 51 so as to cause a carriage composing the optical system 41 to move in the radial directions of the disk 40. The focus/tracking servo circuit 50 drives and controls a focus and tracking actuator (not shown in the figure) of the optical system 41 so as to perform a focus/tracking control.

The reproduction signal reproduced by the optical system 41 is supplied to the RF amplifier 49. The RF amplifier 49 amplifies the reproduction signal. A primary signal of the reproduction signal is supplied to the DVD encode/decode circuit 53, and is decoded thereby. Additionally, various servo signals are extracted and output to each of the servo circuits.

The RAM 56 is used as a working storage for processes in the DVD encode/decode circuit 53. The interface/buffer controller 59 exchanges data with the host computer 61, and controls a data buffer. The RAM 58 is used as a working storage for the interface/buffer controller 59.

The CPU 60 controls the optical disk device 100 as a whole according to commands from the host computer 61.

On an optical disk, such as the DVD-R disk, the wobble is formed beforehand along the track that is to be formed so as to record information. By detecting this wobble, a wobble signal is reproduced. Additionally, on the disk, the pre-pits are formed on the land. By reproducing these pre-pits, information, such as an address representing a disk position is obtained. In this course, in order to obtain accurate information, such as an address, a pre-pit signal needs to be converted accurately into digital data.

Besides, the LPP needs to be read out accurately also before recording, during recording, and after recording.

At this point, a description will be given of a method of detecting the pre-pits.

FIG. 3 is a diagram for explaining a conventional pre-pit detecting method.

To detect the pre-pits, [(Sa+Sd)−(Sb+Sc)] is obtained, first, assuming that a detection signal in the zone A shown in FIG. 2 is Sa, that a detection signal in the zone B is Sb, that a detection signal in the zone C is Sc, and that a detection signal in the zone D is Sd. In FIG. 3, a solid line represents a waveform of (Sa+Sd), and a dashed line represents a waveform of (Sb+Sc).

Next, by comparing a waveform of [(Sa+Sd)−(Sb+Sc)] with a predetermined level L11 as a threshold value, the LPP is detected. However, during recording, a power of the laser beam LB fluctuates in a pulse form according to information being recorded. This fluctuation becomes noises which impede the detection of the LPP.

FIG. 4 and FIG. 5 illustrate how the fluctuation of the power of the laser beam LB impedes the detection of the LPP. In FIG. 4, a solid line represents the waveform of (Sa+Sd), and a dashed line represents the waveform of (Sb+Sc). FIG. 5 represents the waveform of [(Sa+Sd)−(Sb+Sc)].

In FIG. 4 and FIG. 5, the power of the laser beam is at a write power level at times t1 and t2, and the power of the laser beam is at a read power level at a time t3.

At the times t1 and t2, since the pre-pits are detected with the write power level, the pre-pits are clearly distinguished from surroundings; accordingly, signal levels at the pre-pits are prominent. At the time t3, since the laser beam at the read power level is projected on the pre-pit, a detection signal level becomes smaller than the detection signal levels that are detected when the laser beam at the write power level is projected on the pre-pits. Accordingly, there has been a risk that the detection signal of the pre-pit at the time t3 may become undetectable being buried in the levels of wobble signals detected with the write power level.

As a solution therefor, there has been proposed a technology described in Japanese Laid-Open Patent Application No. 10-283638. In the technology described in Japanese Laid-Open Patent Application No. 10-283638, the LPP is detected at a gate timing of a sample-and-hold circuit, etc.

However, since the technology described in Japanese Laid-Open Patent Application No. 10-283638 necessitates the gate timing of the sample-and-hold circuit, etc., a control therefor is complicated. Additionally, there is a problem that noises occur due to the sampling-and-holding. Further, there is a problem that the sampling-and-holding becomes difficult to perform as a recording speed becomes higher.

SUMMARY OF THE INVENTION

It is a general object of the present invention to provide an improved and useful optical disk device in which the above-mentioned problems are eliminated.

A more specific object of the present invention is to provide a pre-pit detecting method for an optical disk device and an optical disk device which can surely detect pre-pit information with a simple configuration.

In order to achieve the above-mentioned objects, there is provided according to one aspect of the present invention an optical disk device causing a light beam to be projected intermittently with different powers on a disk on which a pre-pit is formed beforehand at a peak of a wobble of a track wobbled in radial directions of the disk, the device having a first detector detecting a portion of a reflected light of the light beam, the portion being reflected from a side of the track at which the pre-pit is formed, a second detector detecting a portion of the reflected light of the light beam, the portion being reflected from the other side of the track, a first amplifier amplifying a first detection signal detected by the first detector, and a second amplifier amplifying a second detection signal detected by the second detector, wherein a gain of at least one of the first amplifier and the second amplifier is so set that a peak value of a signal component of the first detection signal, the signal component corresponding to the wobble of the track, coincides with a bottom value of a signal component of the second detection signal, the signal component corresponding to the wobble of the track.

Additionally, in the optical disk device according to the present invention, the gain of the second amplifier may be made variable according to a difference between an output of the first amplifier and an output of the second amplifier.

Additionally, the optical disk device according to the present invention may further have a differential amplifier obtaining a difference between an output of the first amplifier and an output of the second amplifier, and a comparator slicing an output signal of the differential amplifier with a predetermined slice level so as to detect the pre-pit.

Additionally, in the optical disk device according to the present invention, the slice level may be a value obtained by holding a peak of the output signal of the differential amplifier.

Additionally, the optical disk device according to the present invention may further have a timing generation circuit generating a mask timing signal used for masking the output signal of the differential amplifier so as to prohibit a peak of a signal representing the pre-pit from being held.

According to the present invention, the gain of the first amplifier amplifying the detection signal detected by the first detector and/or the gain of the second amplifier amplifying the detection signal detected by the second detector are/is so set that the peak value of the signal component of the detection signal detected by the first detector detecting the portion of the reflected light of the light beam reflected from the pre-pit-formed side of the track, the signal component corresponding to the wobble of the track, coincides with the bottom value of the signal component of the detection signal detected by the second detector detecting the portion of the reflected light of the light beam reflected from the other side of the track, the signal component corresponding to the wobble of the track. Thereby, even in a case where a pre-pit is detected when the power of the laser (light) beam is at a read power level, preceding and following wobble signals read with a write power level are caused to be at "0" level; accordingly, the pre-pit signal is not buried in the wobble signals read with the write power level; thus, the pre-pit signal can be detected accurately.

Other objects, features and advantages of the present invention will become more apparent from the following detailed description when read in conjunction with the accompanying drawings.

DETAILED DESCRIPTION OF THE PREFERRED EMBODIMENTS

Figure 1:
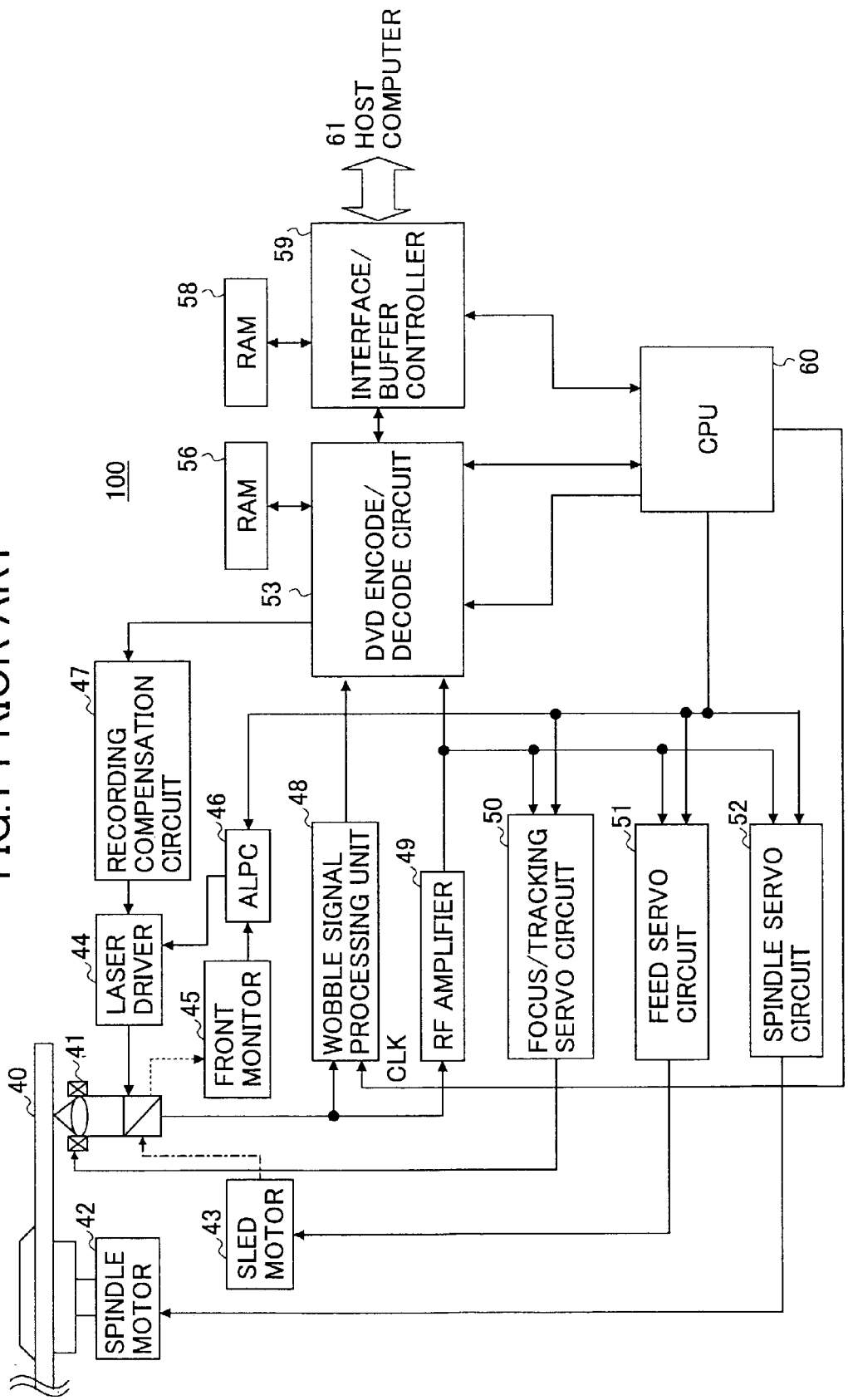
FIG. 1 is a block diagram of an optical disk device.
Figure 2:
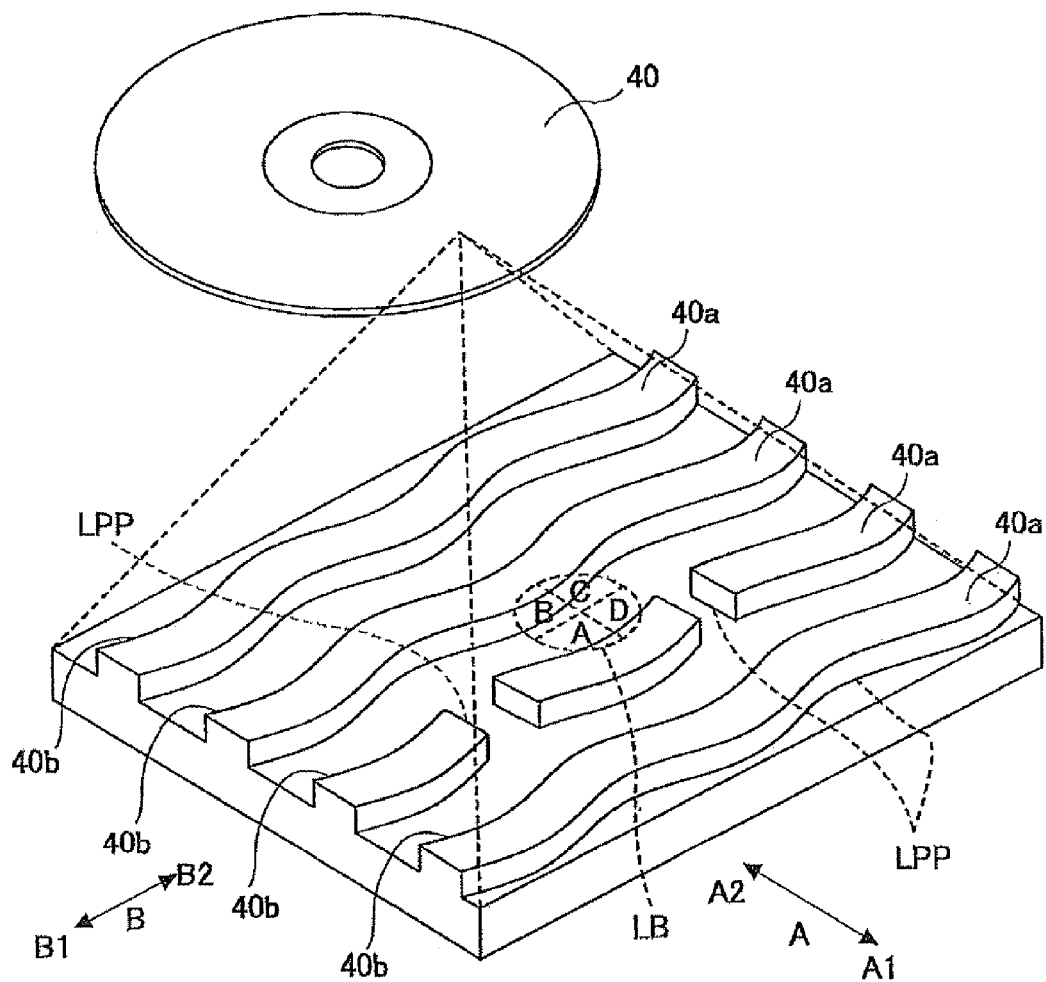
FIG. 2 is an illustration for explaining a structure of an optical disk.
Figure 3:
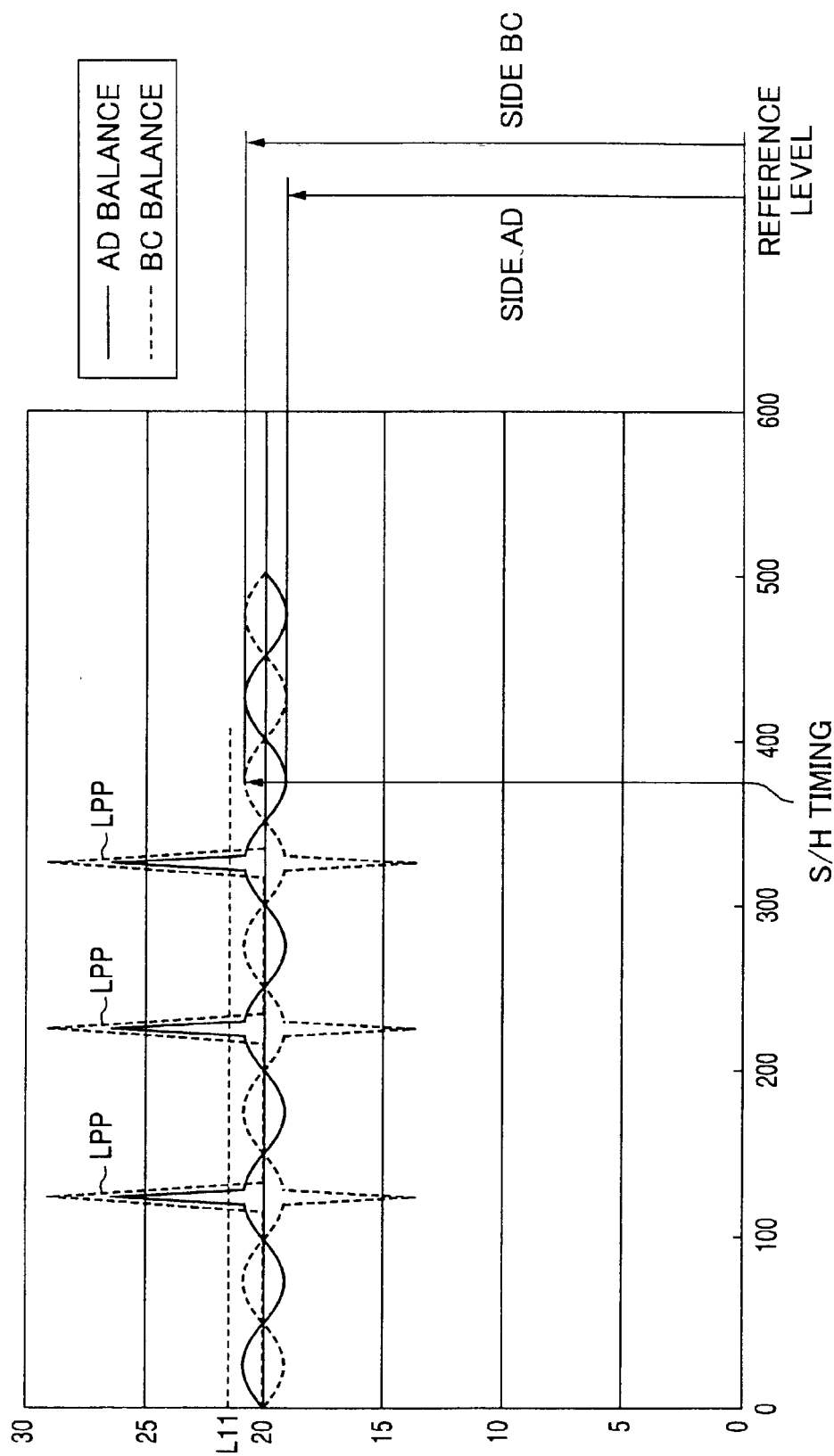
FIG. 3 is a diagram for explaining a conventional pre-pit detecting method.
Figure 4:
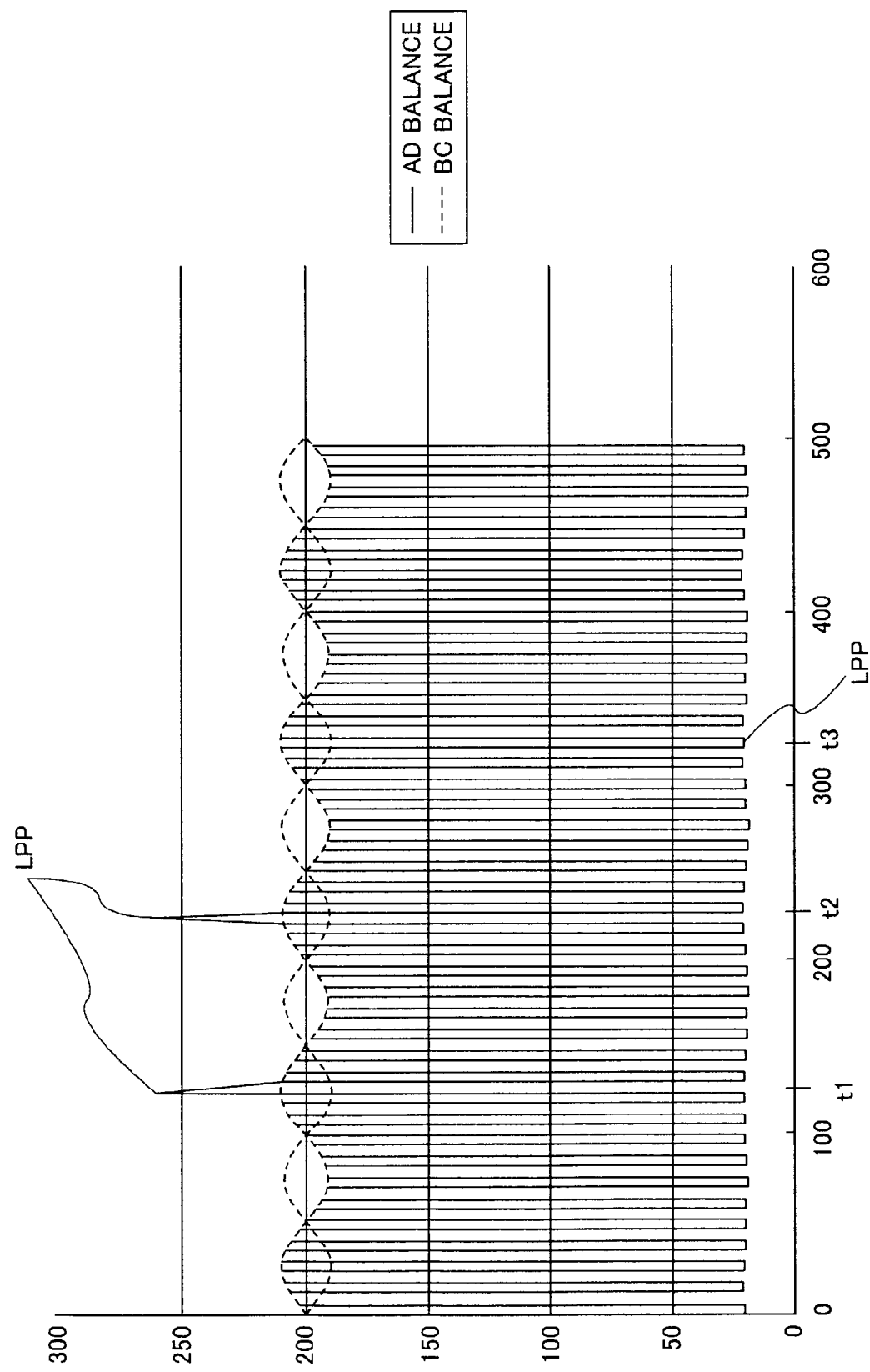
FIG. 4 is a first diagram for explaining operations of the conventional pre-pit detecting method.
Figure 5:
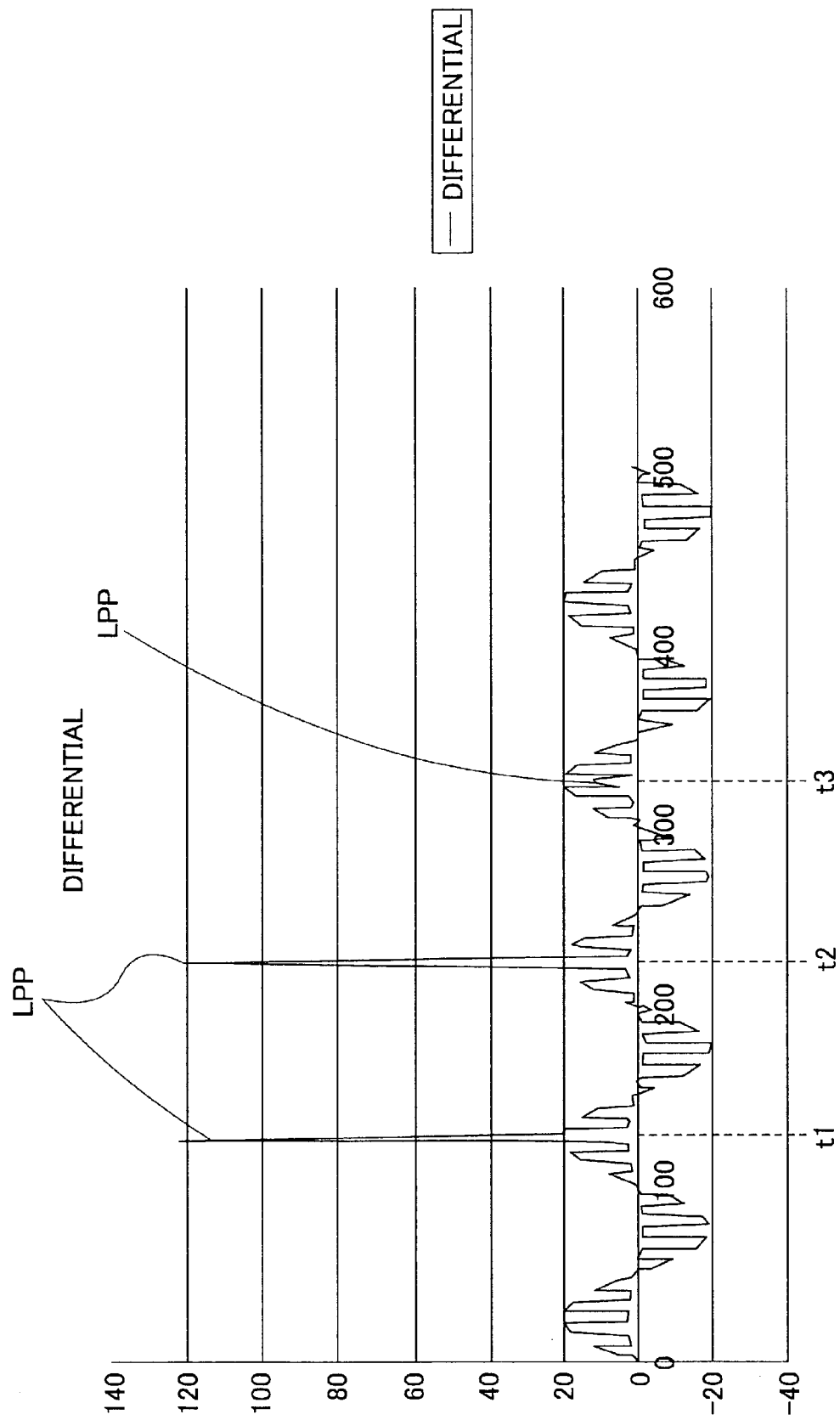
FIG. 5 is a second diagram for explaining operations of the conventional pre-pit detecting method.

A description will now be given of an embodiment of the present invention. It is noted that a configuration as a whole is similar as in FIG. 1, and thus a description thereof will be omitted.

Figure 6:
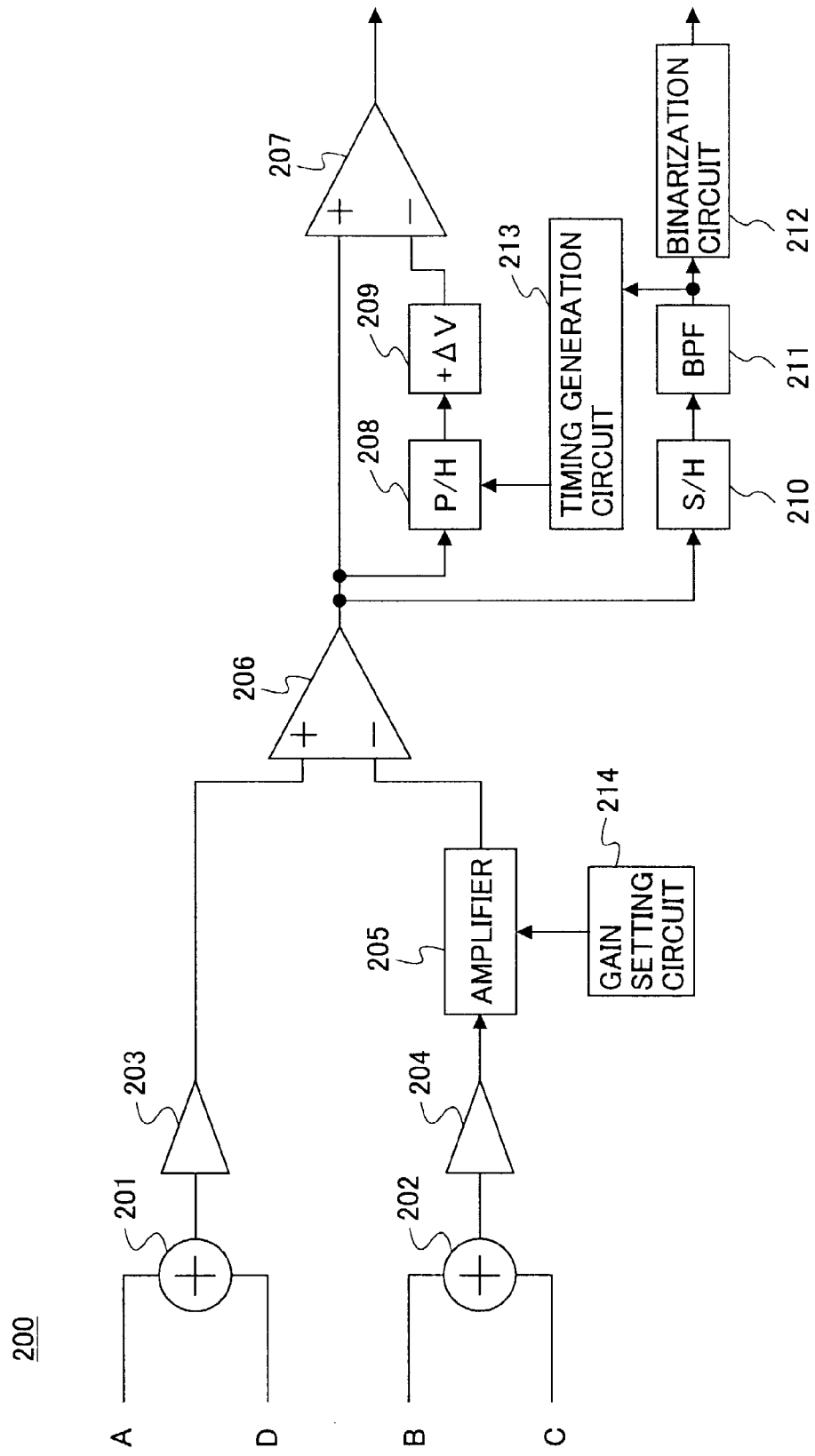
FIG. 6 is a circuit diagram of a pre-pit detection unit according to an embodiment of the present invention.
Figure 7:
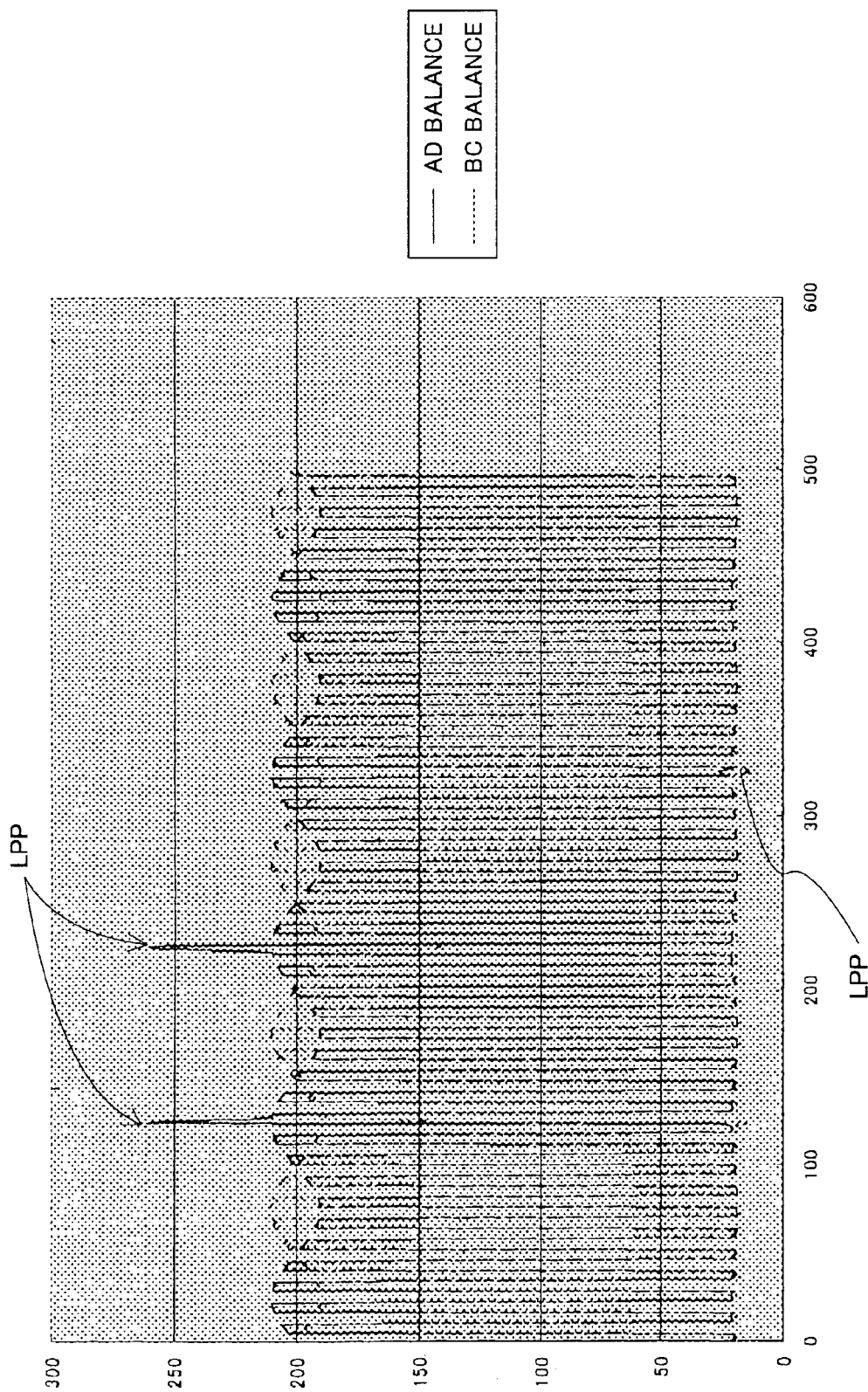
FIG. 7 is an operational waveform diagram of the pre-pit detection unit according to the present embodiment.
Figure 8:
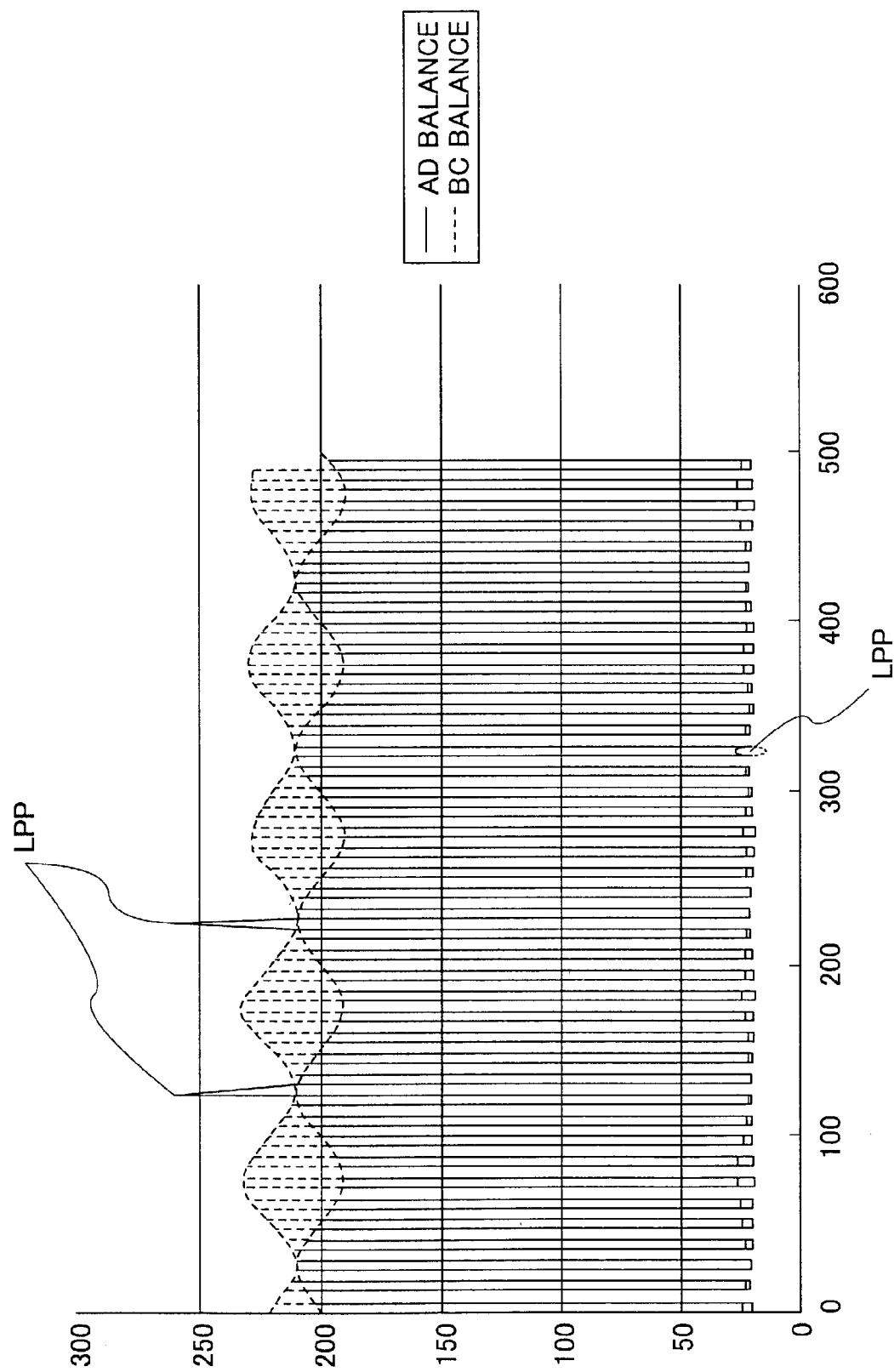
FIG. 8 is another operational waveform diagram of the pre-pit detection unit according to the present embodiment.
Figure 9:
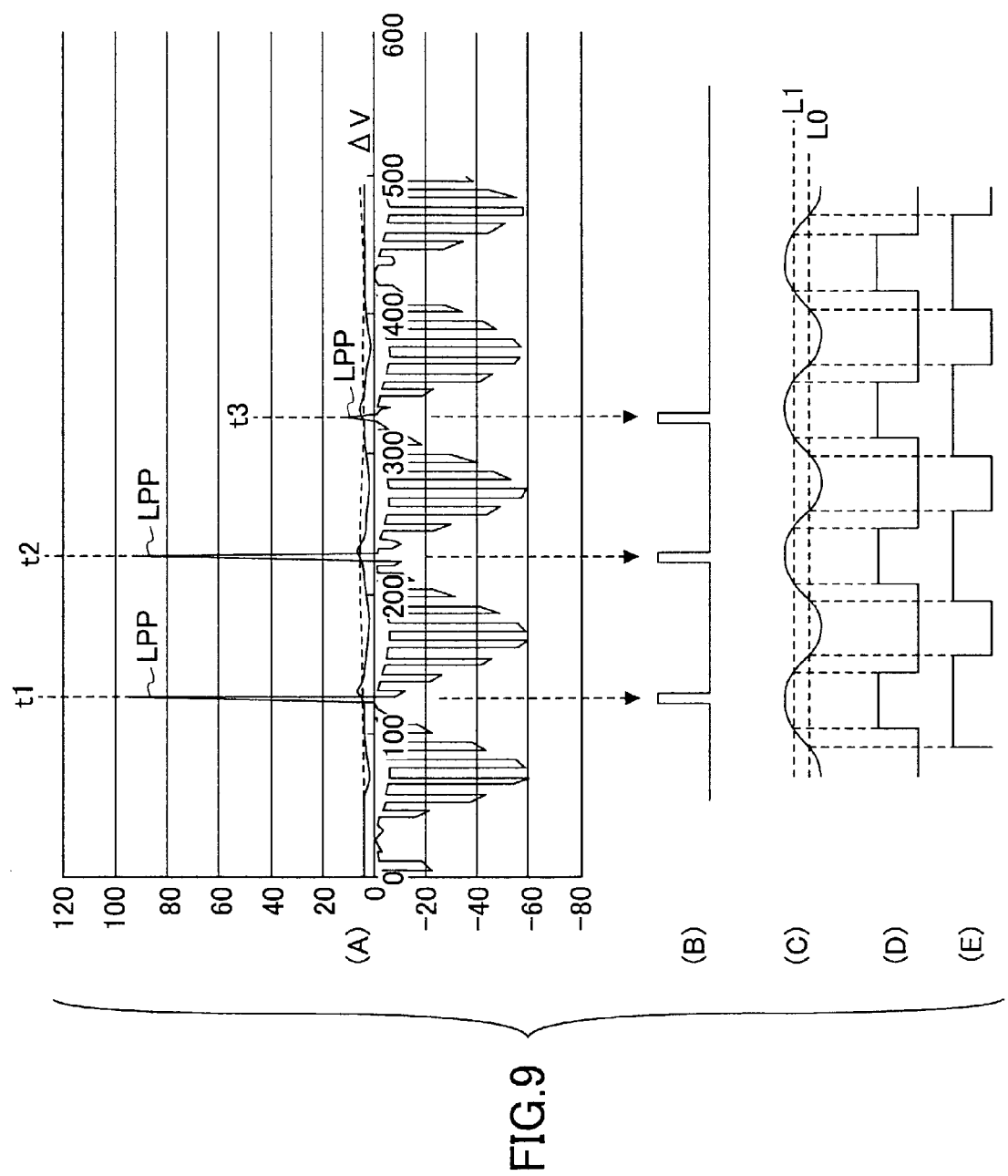
FIG. 9 is another operational waveform diagram of the pre-pit detection unit according to the present embodiment.

FIG. 6 is a circuit diagram of a pre-pit detection unit according to one embodiment of the present invention. FIG. 7 to FIG. 9 are operational waveform diagrams of the pre-pit detection unit according to the present embodiment.

A pre-pit detection unit 200 according to the present embodiment comprises adders 201 and 202, amplifiers 203, 204 and 205, a differential amplification circuit 206, a comparator 207, a peak hold circuit 208, an offset adjustment circuit 209, a sample-and-hold circuit 210, a band pass filter 211, and a binarization circuit 212.

The detection signal in the zone A of the quadripartite photodetector and the detection signal in the zone D thereof are supplied to the adder 201. It is noted that at least the zones A and D of the quadripartite photodetector form a first detector. The adder 201 outputs an addition signal obtained by adding the detection signal in the zone A and the detection signal in the zone D. The addition signal of the adder 201 is supplied to the amplifier 203 The amplifier 203 amplifies the addition signal. An output signal of the amplifier 203 becomes as indicated by a solid line in FIG. 7. It is noted that at least the amplifier 203 forms a first amplifier.

As shown in FIG. 7, since a pre-pit (LPP) at the right side in each of these figures is detected when the power of the laser beam is at the read power level, a detection level thereof exhibits so small a change compared to surrounding levels as to be buried in detection signals detected with the write power level.

In this course, in the amplifier 203, a gain of the addition signal supplied from the adder 201 is controlled so that a peak value of the addition signal becomes a predetermined level. The output signal of the amplifier 203 is supplied to a noninverting input terminal of the differential amplification circuit 206.

The detection signal in the zone B of the quadripartite photodetector and the detection signal in the zone C thereof are supplied to the adder 202. It is noted that at least the zones B and C of the quadripartite photodetector form a second detector. The adder 202 outputs an addition signal obtained by adding the detection signal in the zone B and the detection signal in the zone C. The addition signal of the adder 202 is supplied to the amplifier 204. The amplifier 204 amplifies the addition signal. An output signal of the amplifier 204 becomes as indicated by a dashed line in FIG. 7.

In this course, in the amplifier 204, a gain of the addition signal supplied from the adder 202 is controlled so that a peak value of the addition signal becomes a predetermined level. At this point, the gain in the amplifier 204 may be set smaller than the gain in the amplifier 203. The output signal of the amplifier 204 is supplied to the amplifier 205. The amplifier 205 amplifies the output signal of the amplifier 204 with a gain set by a gain setting circuit 214. In this course, the gain setting circuit 214 sets the gain so that a peak envelope of the output signal of the amplifier 203, i.e., a peak value of amplitude of wobble signal components detected with the write power level, coincides with a peak envelope of the output signal of the amplifier 204, i.e., a bottom value of amplitude of wobble signal components detected with the write power level. Accordingly, an output signal of the amplifier 205 becomes as indicated by a dashed line in FIG. 8. It is noted that at least the amplifiers 204 and 205 form a second amplifier. The signal amplified by the amplifier 205 is supplied to an inverting input terminal of the differential amplification circuit 206.

The differential amplification circuit 206 subtracts the output signal of the amplifier 205 from the output signal of the amplifier 203. An output of the differential amplification circuit 206 is a wobble signal including LPPs, and assumes a waveform as shown in FIG. 9-(A).

The output of the differential amplification circuit 206 is supplied to a noninverting input terminal of the comparator 207, the peak hold circuit 208, and the sample-and-hold circuit 210. The peak hold circuit 208 holds a peak value of the output signal of the differential amplification circuit 206.

The peak value held by the peak hold circuit 208 is supplied to the offset adjustment circuit 209. The offset adjustment circuit 209 adjusts an offset value of the output (the peak value) of the peak hold circuit 208. The peak value subjected to the offset adjustment by the offset adjustment circuit 209 is indicated by a solid line shown in FIG. 9-(A).

The peak value adjusted by the offset adjustment circuit 209 is supplied to an inverting input terminal of the comparator 207 as a slice level for detecting LPPs.

The comparator 207 compares the output of the differential amplification circuit 206 with the output (the slice level) of the offset adjustment circuit 209; when the output of the differential amplification circuit 206 is larger than the output of the offset adjustment circuit 209, the comparator 207 makes an output thereof high-level; when the output of the differential amplification circuit 206 is smaller than the output of the offset adjustment circuit 209, the comparator 207 makes the output thereof low-level. FIG. 9-(B) shows an waveform of the output of the comparator 207.

In FIG. 9-(A), detection signals detected with the write power level around the pre-pit at the time t3 become substantially "0" level, because the peak envelope of the output signal of the amplifier 203, i.e., the peak of the amplitude of the wobble signal components detected with the write power level, coincides with a peak envelope of the output signal of the amplifier 205, i.e., the bottom of the amplitude of the wobble signal components detected with the write power level. In other parts, detection signals detected with the write power level become smaller than "0" level, because the output signal of the amplifier 205 is larger than the output signal of the amplifier 203. Therefore, the pre-pit detection signal buried in the detection signals detected with the write power level is exposed from the wobble signal components. Accordingly, the pre-pit signal becomes larger than the signal output as the slice level from the offset adjustment circuit 209 so that only the pre-pit signal is output from the comparator 207 accurately.

Besides, the sample-and-hold circuit 210 samples the output of the differential amplification circuit 206 shown in FIG. 9-(A) at a sampling period sufficiently shorter than a period of the output of the differential amplification circuit 206, and holds the output of the differential amplification circuit 206. An output of the sample-and-hold circuit 210 is supplied to the band pass filter 211. The band pass filter 211 removes unnecessary frequency band components from the output of the sample-and-hold circuit 210. FIG. 9-(C) shows an output of the band pass filter 211. The output of the band pass filter 211 is supplied to the binarization circuit 212 and a timing generation circuit 213.

The binarization circuit 212 compares the output of the band pass filter 211 with a threshold value L0 as a criterion. As shown in FIG. 9-(E), the binarization circuit 212 binarizes the output of the band pass filter 211 by outputting a high level when the output of the band pass filter 211 is larger than the threshold value L0, and by outputting a low level when the output of the band pass filter 211 is smaller than the threshold value L0. A signal binarized by the binarization circuit 212 is supplied as a wobble signal.

The timing generation circuit 213 compares the output of the band pass filter 211 with a threshold value L1 larger than the threshold value L0 as the criterion. As shown in FIG. 9-(D), the timing generation circuit 213 generates the binary timing signal by outputting a high level when the output of the band pass filter 211 is larger than the threshold value L1, and by outputting a low level when the output of the band pass filter 211 is smaller than the threshold value L1. The timing signal generated by the timing generation circuit 213 is supplied to the peak hold circuit 208. The peak hold circuit 208 masks the output of the differential amplification circuit 206 when the timing signal from the timing generation circuit 213 is high-level. By masking the peak hold circuit 208 according to the timing signal, the peak hold of an LPP is prohibited.

According to the present embodiment, even when a pre-pit (an LPP) is included in a period in which the power of the light beam is at a level other than a recording level (the write power level) as shown in FIG. 7 and FIG. 8, the LPP can be detected as shown in FIG. 9. Thus, the LPP can be detected accurately.

Besides, in the present embodiment, although the wobble signal is produced from the output of the differential amplification circuit 206, the wobble signal may be produced directly from the four detection signals Sa, Sb, Sc and Sd [(Sa+Sd)−(Sb+Sc)] of the quadripartite photodetector. Here, the detection signal Sa represents the detection signal in the zone A; the detection signal Sb represents the detection signal in the zone B; the detection signal Sc represents the detection signal in the zone C; and the detection signal Sd represents the detection signal in the zone D.

Figure 10:
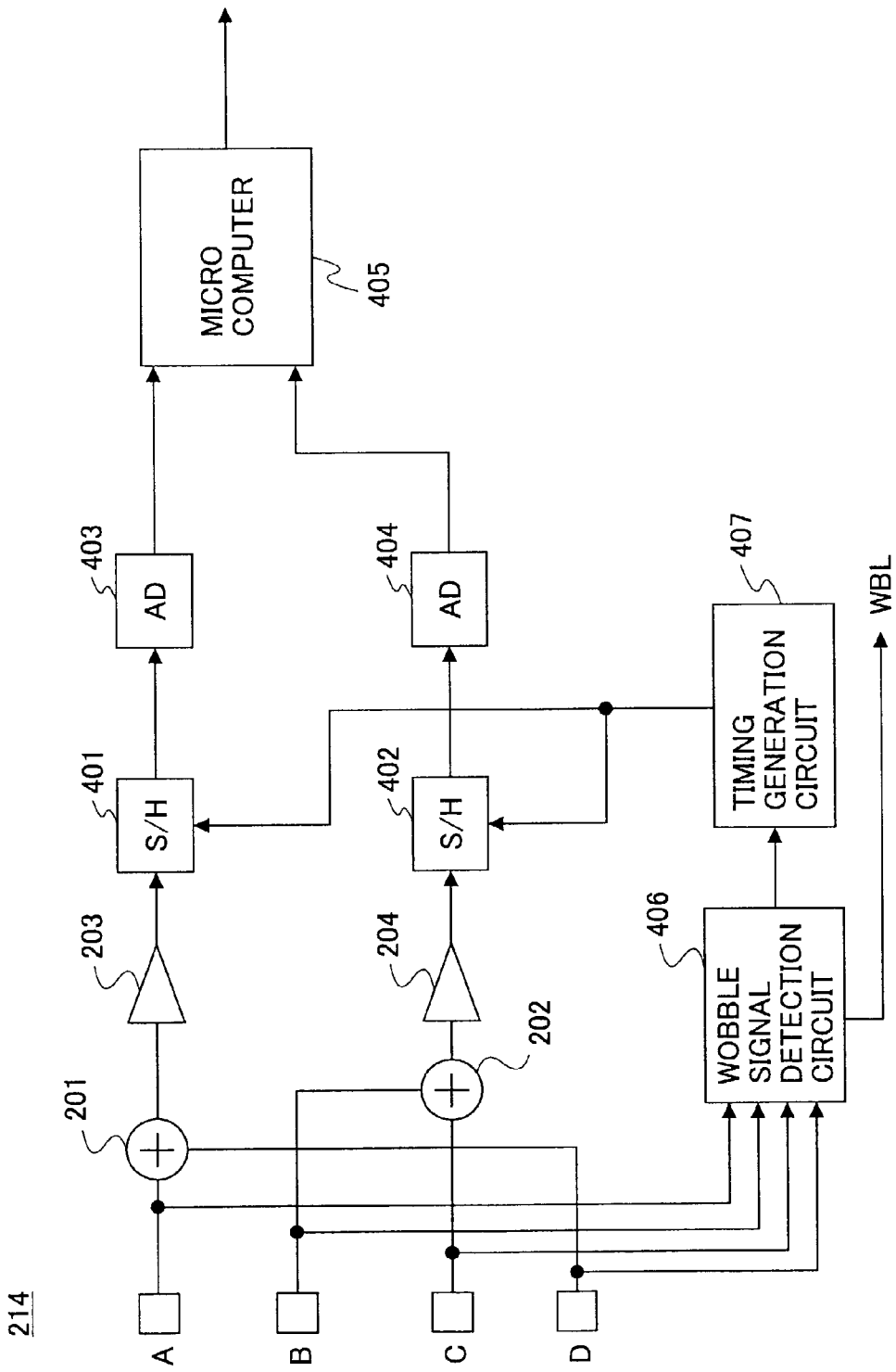
FIG. 10 is a block diagram of a gain setting circuit shown in FIG. 6.

Next, a description will be given of the gain setting circuit 214. FIG. 10 is a block diagram of the gain setting circuit 214. Elements in FIG. 10 that are identical or equivalent to the elements shown in FIG. 6 are referenced by the same reference marks, and will not be described in detail.

The gain setting circuit 214 comprises sample-and-hold circuits 401 and 402, AD (Analog-Digital) conversion circuits 403 and 404, a microcomputer 405, a wobble signal detection circuit 406, and a timing generation circuit 407.

The wobble signal detection circuit 406 is supplied with the detection signals from the zones A, B, C and D of the quadripartite photodetector. The wobble signal detection circuit 406 detects a wobble signal by calculating [(Sa+Sd)−(Sb+Sc)] from the detection signals Sa, Sb, Sc and Sd from the zones A, B, C and D of the quadripartite photodetector. The wobble signal detected by the wobble signal detection circuit 406 is supplied to the timing generation circuit 407, and is also binarized. The timing generation circuit 407 generates a timing signal at a peak of amplitude of the detected wobble signal, and supplies the timing signal to the sample-and-hold circuits 401 and 402. Besides, when sampling-and-holding processes are performed at a timing coinciding with a phase including a pre-pit (an LPP), the amplitude of the detected wobble signal cannot be detected accurately; thus, it is more preferable that the sampling-and-holding processes are performed at a timing reverse to the phase including a pre-pit (an LPP).

The sample-and-hold circuit 401 is supplied with the output signal of the amplifier 203 and the output timing signal of the timing generation circuit 407. The sample-and-hold circuit 401 samples the output signal of the amplifier 203 according to the output timing signal of the timing generation circuit 407, and holds the output signal of the amplifier 203. An output signal of the sample-and-hold circuit 401 is supplied to the AD conversion circuit 403.

The AD conversion circuit 403 converts the signal held by the sample-and-hold circuit 401 into digital data. The output digital data of the AD conversion circuit 403 is supplied to the microcomputer 405.

The sample-and-hold circuit 402 is supplied with the output signal of the amplifier 204 and the output timing signal of the timing generation circuit 407. The sample-and-hold circuit 402 samples the output signal of the amplifier 204 according to the output timing signal of the timing generation circuit 407, and holds the output signal of the amplifier 204. An output signal of the sample-and-hold circuit 402 is supplied to the AD conversion circuit 404.

The AD conversion circuit 404 converts the analog signal held by the sample-and-hold circuit 402 into digital data. The output digital data of the AD conversion circuit 404 is supplied to the microcomputer 405.

Next, a description will be given of an operation of setting the gain of the amplifier 205 by the gain setting circuit 214.

When the disk is mounted, the disk is subjected to a revolution control, and the laser is applied by a DC emission at a reproducing level (the read power level) so that an unrecorded part of the disk is reproduced. The wobble signal detected from a radial push signal of the light reflected from the disk is supplied to the timing generation circuit 407 so as to generate the timing signal at the peak of the amplitude of the wobble signal.

The timing signal is supplied to the sample-and-hold circuit 401 so as to sample and hold a peak value of the signals detected in the zones A and D of the quadripartite photodetector, i.e., a peak value of amplitude of signals modulated according to wobbles. Concurrently, the timing signal is supplied to the sample-and-hold circuit 402 so as to sample and hold a bottom value of the signals detected in the zones B and C of the quadripartite photodetector, i.e., a bottom value of amplitude of signals modulated according to wobbles.

The peak value and the bottom value sampled and held are supplied via the AD conversion circuits 403 and 404, respectively, to the microcomputer 405. The microcomputer 405 calculates the gain of the amplifier 205 which causes the supplied peak value and the supplied bottom value to coincide, and sets the calculated gain in the amplifier 205. Thus, the optimal gain is set.

Besides, in the present embodiment, although an optimal gain is calculated and set each time a disk is mounted, optimal gains may be stored in a memory according to types of disks. Accordingly, from the next time on, when a gain corresponding to a mounted disk exists in the memory, the gain can be read out from the memory, and be set in the amplifier 205.

In addition, although in FIG. 10 the gain is set in the amplifier after the signals held by the sample-and-hold circuits 401 and 402 are converted into digital data and the optimal gain is calculated by the microcomputer, the optimal gain may be adjusted with the gain of the amplifier being actually varied.

Figure 11:
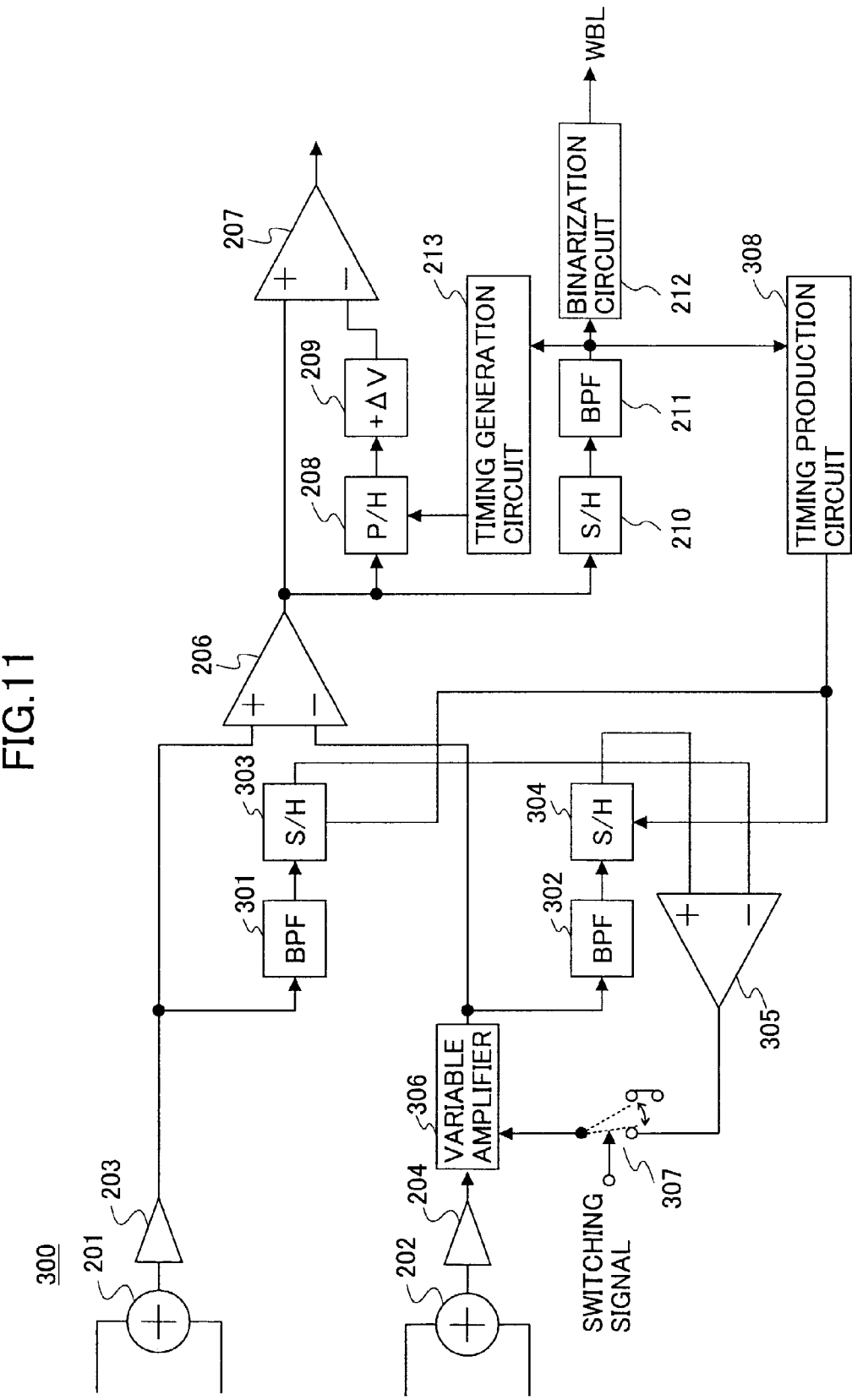
FIG. 11 is a block diagram of a variation of the pre-pit detection unit according to the present embodiment.

FIG. 11 is a block diagram of a variation of the pre-pit detection unit according to the present embodiment. Elements in FIG. 11 that are identical or equivalent to the elements shown in FIG. 6 are referenced by the same reference marks, and will not be described in detail.

A pre-pit detection unit 300 according to the present variation comprises a variable amplifier 306 in place of the amplifier 205. Additionally, the pre-pit detection unit 300 comprises band pass filters 301 and 302, sample-and-hold circuits 303 and 304, a differential amplification circuit 305, an adjustment on/off switch 307, and a timing production circuit 308, in place of the gain setting circuit 214.

The band pass filter 301 is supplied with the output of the amplifier 203. The band pass filter 301 removes unnecessary components from the output of the amplifier 203. An output signal of the band pass filter 301 is supplied to the sample-and-hold circuit 303.

The sample-and-hold circuit 303 samples the output signal of the band pass filter 301 according to an output timing signal of the timing production circuit 308, and holds the output signal of the band pass filter 301. The signal held by the sample-and-hold circuit 303 is supplied to an inverting input terminal of the differential amplification circuit 305.

The band pass filter 302 is supplied with an output of the variable amplifier 306. The band pass filter 302 removes unnecessary components from the output of the variable amplifier 306. An output signal of the band pass filter 302 is supplied to the sample-and-hold circuit 304.

The sample-and-hold circuit 304 samples the output signal of the band pass filter 302 according to the output timing signal of the timing production circuit 308, and holds the output signal of the band pass filter 302. The signal held by the sample-and-hold circuit 304 is supplied to an inverting input terminal of the differential amplification circuit 305.

The differential amplification circuit 305 outputs a signal corresponding to a difference between the output of the sample-and-hold circuit 303 and the output of the sample-and-hold circuit 304. The output signal of the differential amplification circuit 305 is supplied to the variable amplifier 306 via the switch 307. The variable amplifier 306 amplifies the output of the amplifier 204 with a gain corresponding to the signal from the switch 307. The output of the variable amplifier 306 is supplied to the inverting input terminal of the differential amplification circuit 206.

The switch 307 is turned on/off according to a switching signal supplied externally; the switch 307 is turned on upon setting a gain; the gain is set according to the output signal of the differential amplification circuit 305; upon completion of the setting, the switch 307 is turned off.

Next, a description will be given of an operation of setting the gain of the variable amplifier 306.

When the disk is mounted, the disk is subjected to a revolution control, and the laser is applied by a DC emission at the reproducing level so as to reproduce an unrecorded part of the disk. At this point, the adjustment on/off switch 307 is switched from the off state to the on state. Additionally, the sample-and-hold circuit 210 is brought into a through state.

The wobble signal output from the differential amplification circuit 206 via the sample-and-hold circuit 210 and the band pass filter 211 is supplied to the timing production circuit 308. The timing production circuit 308 produces the timing signal at a peak value of amplitude of the wobble signal. The timing signal is supplied to the sample-and-hold circuits 303 and 304.

In the sample-and-hold circuit 303, a peak value of the signals detected in the zones A and D of the quadripartite photodetector, i.e., a peak value of amplitude of signals modulated according to wobbles is sampled and held. In the sample-and-hold circuit 304, a bottom value of the signals detected in the zones B and C of the quadripartite photodetector, i.e., a bottom value of amplitude of signals modulated according to wobbles is sampled and held.

The peak value sampled and held in the sample-and-hold circuit 303 and the bottom value sampled and held in the sample-and-hold circuit 304 are supplied to the differential amplification circuit 305. The differential amplification circuit 305 outputs the signal corresponding to the difference between the peak value sampled and held in the sample-and-hold circuit 303 and the bottom value sampled and held in the sample-and-hold circuit 304. The output of the differential amplification circuit 305 is supplied to the variable amplifier 306 via the switch 307. According to the output of the differential amplification circuit 305, the gain of the variable amplifier 306 is set so that the peak value and the bottom value coincide, i.e., the output thereof becomes "0". After the gain of the variable amplifier 306 is set, the switch 307 is turned off, whereupon the operation of setting the gain of the variable amplifier 306 is finished.

Besides, although the foregoing embodiment is described by taking the DVD-R/RW as an example, the present invention is applicable to an optical disk device in which pre-pits are formed on a disk, and a light beam is projected thereon intermittently.

The present invention is not limited to the specifically disclosed embodiments, and variations and modifications may be made without departing from the scope of the present invention.

The present application is based on Japanese priority application No. 2001-331260 filed on Oct. 29, 2001, the entire contents of which are hereby incorporated by reference.

What is claimed is:

1. An optical disk device causing a light beam to be projected intermittently with different powers on a disk having a track with a wobbled groove formed along the track undulating in a radial direction of the disk at a predetermined cycle for forming a wobble signal with the track having land areas between grooves on which pre-pits are formed beforehand at locations corresponding to peaks of the wobble along the track in radial directions of the disk, the device comprising:

a first detector detecting a portion of a reflected light of said light beam, the portion being reflected from a side of said track at which said pre-pit is formed;

a second detector detecting a portion of the reflected light of said light beam, the portion being reflected from the other side of said track;

a first amplifier amplifying a first detection signal detected by said first detector with the first detection signal corresponding to a first set of wobble signal components; and a second amplifier amplifying a second detection signal detected by said second detector with the second detection signal corresponding to a second set of wobble signal components, wherein a gain of at least one of said first amplifier and said second amplifier is so set that a peak envelope of the output signal of the first amplifier which corresponds to the peak value of the amplitude of the first set of wobble signal components coincides with a peak envelope of the output signal of the second amplifier which corresponds to the bottom value of amplitude of the second set of wobble signal components for enabling the detection of said pre-pits and for distinguishing the pre-pits from the wobble signal.

2. The optical disk device as claimed in claim 1, wherein the gain of said second amplifier is variable according to a difference between an output of said first amplifier and an output of said second amplifier.

3. The optical disk device as claimed in claim 1, further comprising:

a differential amplifier obtaining a difference between an output of said first amplifier and an output of said second amplifier to produce a resultant wobble signal in which the pre-pits are accentuated; and a comparator slicing an output signal of said differential amplifier with a predetermined slice level so as to detect said pre-pits.

4. The optical disk device as claimed in claim 3, wherein said slice level is a value obtained by holding a peak of said output signal of said differential amplifier.

5. The optical disk device as claimed in claim 3, further comprising a timing generation circuit generating a mask timing signal used for masking said output signal of said differential amplifier so as to prohibit a peak of a signal representing said pre-pit from being held.

6. The optical disk device as claimed in claim 4, further comprising a timing generation circuit generating a mask timing signal used for masking said output signal of said differential amplifier so as to prohibit a peak of a signal representing said pre-pit from being held.

7. An optical disk device irradiating a disk having a track with a wobbled groove formed along the track undulating in a radial direction of the disk at a predetermined cycle with a light beam at different power levels to detect a land pre-pit formed in a land on the wobbled track with the land pre-pit being positioned at a peak of the wobble of the track, the device comprising:
- a first detector for detecting a first portion of the light beam reflected from one side of the track at which the land pre-pit is formed;
- a second detector for detecting a second portion of the light beam reflected from the other side of the track;
- a first amplifier amplifying a first detection signal detected by the first detector with the first detection signal corresponding to a first set of wobble signal components;
- a second amplifier amplifying a second detection signal detected by the second detector with the second detection signal corresponding to a second set of wobble signal components wherein a gain of at least one of the first and second amplifiers being set such that a peak envelope of the output signal of the first amplifier which corresponds to the peak value of the amplitude of the first set of wobble signal components is consistent with a peak envelope of the output signal of the second amplifier which corresponds to the bottom value of amplitude of the second set of wobble signal components;
- a differential amplifier obtaining a difference between an output of the first amplifier and an output of the second amplifier; and
- a comparator slicing an output signal of the differential amplifier with a predetermined slice level so as to detect the land pre-pit.

* * * * *